(12) United States Patent
Canipe et al.

(10) Patent No.: US 7,303,128 B2
(45) Date of Patent: Dec. 4, 2007

(54) SYSTEM AND METHOD FOR MANAGING ASSETS USING A PORTABLE COMBINED ELECTRONIC ARTICLE SURVEILLANCE SYSTEM AND BARCODE SCANNER

(75) Inventors: Larry Canipe, Boca Raton, FL (US); Steven V. Leone, Lake Worth, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 0 days.

(21) Appl. No.: 10/412,740

(22) Filed: Apr. 11, 2003

(65) Prior Publication Data
US 2003/0234288 A1 Dec. 25, 2003

Related U.S. Application Data

(60) Provisional application No. 60/372,016, filed on Apr. 11, 2002.

(51) Int. Cl.
*G06K 7/10* (2006.01)
(52) U.S. Cl. .............................. 235/462.01; 235/462.13
(58) Field of Classification Search ........... 235/462.01, 235/462.13, 383, 472.02; 340/572
See application file for complete search history.

(56) References Cited

U.S. PATENT DOCUMENTS

| | | | |
|---|---|---|---|
| 5,151,684 A | 9/1992 | Johnsen | 340/572 |
| 5,640,002 A * | 6/1997 | Ruppert et al. | 235/462.46 |
| 5,979,757 A | 11/1999 | Tracy et al. | 235/383 |
| 6,158,662 A * | 12/2000 | Kahn et al. | 235/472.01 |
| 6,189,789 B1 | 2/2001 | Levine et al. | |
| 6,415,982 B2 * | 7/2002 | Bridgelall et al. | 235/472.01 |
| 6,497,361 B1 * | 12/2002 | Mason | 235/383 |
| 6,592,037 B1 * | 7/2003 | Clancy | 235/462.13 |

FOREIGN PATENT DOCUMENTS

WO    WO 02/43021    5/2002

* cited by examiner

*Primary Examiner*—Lisa Caputo
(74) *Attorney, Agent, or Firm*—Alan M. Weisberg; Christopher & Weisberg, P.A.

(57) ABSTRACT

A system and method of managing assets using a combined electronic article surveillance (EAS) and barcode scanning device. The combined EAS/Scanner is portable and wirelessly connected to a network for facilitating a number of asset management functions, including personal shopping, pre-checkout, data mining, and inventory tracking.

30 Claims, 6 Drawing Sheets

SYSTEM AND METHOD FOR MANAGING ASSETS USING A PORTABLE COMBINED ELECTRONIC ARTICLE SURVEILLANCE SYSTEM AND BARCODE SCANNER

CROSS-REFERENCE TO RELATED APPLICATIONS

The present application claims the benefit of the filing date of U.S. Provisional Application Ser. No. 60/372,016, filed Apr. 11, 2002, the teachings of which are incorporated herein by reference.

FIELD OF THE INVENTION

The present invention relates to electronic article surveillance (EAS), and, more particularly, to a system and method for managing assets using a portable combined EAS system and barcode scanner.

BACKGROUND OF THE INVENTION

A variety of EAS systems are well known for the prevention or deterrence of unauthorized removal of articles from a controlled area. In a typical EAS system, tags designed to interact with an electromagnetic field located at the exits of the controlled area are attached to articles to be protected. If a tag is brought into the electromagnetic field or "interrogation zone", the presence of the tag is detected and appropriate action may be taken. For a controlled area such as a retail store, the appropriate action taken for detection of an EAS tag may be the generation of an alarm. Some types of EAS tags remain attached to the articles to be protected, but are deactivated prior to authorized removal from the controlled area by a deactivation device that changes a characteristic of the tag so that the tag will no longer be detectable in the interrogation zone.

The majority of EAS tag deactivation devices are fixed at a specific location, such as adjacent a point-of-sale (POS) station in a retail environment. A barcode scanner may also be located at the POS station for scanning a barcode affixed to the article. Barcode systems and scanners are well known. Barcodes may be used for a variety of purposes, such as inventory control and for managing POS transactions. In a typical POS transaction, upon purchase of an article, the barcode is scanned at a POS station. The barcode represents a reference number that is communicated to a computer to look up an associated record containing descriptive data such as product name, vendor name, price, quantity-on-hand, etc. The computer does a "price lookup" and displays the price on the cash register. The computer may also subtract the quantity purchased from the quantity-on-hand and perform other informational or management functions related to the purchased products.

When it is determined that the article is authorized for removal from the controlled location, e.g. after a proper purchase, any EAS tag affixed to the article is deactivated. If an EAS tag is inadvertently not deactivated at the deactivator adjacent the POS station, the EAS tag will set off an alarm at the store exit. To then deactivate the EAS tag, the article must be returned to the deactivator adjacent the POS station, which causes customer confusion and embarrassment. In addition, if the purchased article has exhibited a history of avoiding deactivation, e.g. if a manufacturer has placed the tag in an inappropriate location in the article packaging, detection of this history is entirely subject to human efforts. As such, a history of deactivation failure for a particular device may go perpetually unnoticed and uncorrected.

The conventional orientation of the EAS deactivator and barcode scanner at the POS station has also placed significant practical limitations on activities such as scanning large or bulky items that do not physically fit into the area adjacent the POS station, customer self-checkout, and inventory tracking. Handheld devices including deactivators for RF type EAS tags and a barcode scanner have been developed. These devices have, however, been coupled to the POS station via power and data cables. Accordingly, they require the EAS tag be moved near the POS station, within range of the handheld scanner/deactivator cord, for scanning and deactivating. To date, no known system has allowed complete freedom of movement within a controlled area for barcode scanning and EAS tag deactivation.

Accordingly, there is a need for a system and method for managing assets using a portable, handheld combined EAS system and barcode scanner.

SUMMARY OF THE INVENTION

A system consistent with the invention includes a variety of aspects. According to one aspect of the invention there is provided a method of managing an asset carrying a barcode and an EAS tag. The method includes: providing a point of sale (POS) network including a processor configured for accessing a database; providing a portable EAS/Scanner wirelessly connected to the POS network for bi-directional communication with the processor, the EAS/Scanner including an EAS system for modifying an activation state of the EAS tag and a barcode scanner for scanning the barcode; scanning the barcode using the EAS/Scanner; transmitting a signal representative of the barcode from the EAS/Scanner for receipt by the processor; accessing asset information in the database in response to the signal representative of the barcode; and modifying the activation state of the EAS tag using the EAS/Scanner.

According to another aspect of the invention, there is provided a method of facilitating purchase of an asset carrying a barcode and an EAS tag. The method includes: providing network and an EAS/Scanner as described above; scanning a barcode using the EAS/Scanner; transmitting a signal representative of the barcode from the EAS/Scanner for receipt by the processor; accessing asset information in the database in response to the signal representative of the barcode; storing the asset information in a customer-specific database; and deactivating the EAS tag using the EAS/Scanner.

According to another aspect of the invention, there is provided a method of verifying an EAS tag status of an asset carrying a barcode. The method includes providing a network and an EAS/Scanner as described above; scanning the barcode using the EAS/Scanner, transmitting a signal representative of the barcode from the EAS/Scanner for receipt by the processor; accessing asset information in the database in response to the signal representative of the barcode; scanning the item using the EAS/Scanner to detect the EAS tag status; transmitting a signal representative of the EAS tag status from the EAS/Scanner for receipt by the processor; and storing data representative of the EAS tag status in a status database.

According to another aspect of the invention, there is provided a network including: a processor configured for accessing a database; and a portable EAS/Scanner. The EAS/Scanner is wirelessly connected for bi-directional communication with the processor, and includes an EAS system configured to modify an activation state of an EAS tag and a barcode scanner configured to scan the barcode.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

The present invention will be described herein in connection with various exemplary embodiments thereof. Those skilled in the art will recognize that the features and advantages of the present invention may be implemented in a variety of configurations. It is to be understood, therefore, that the embodiments described herein are presented by way of illustration, not of limitation.

Figure 1:
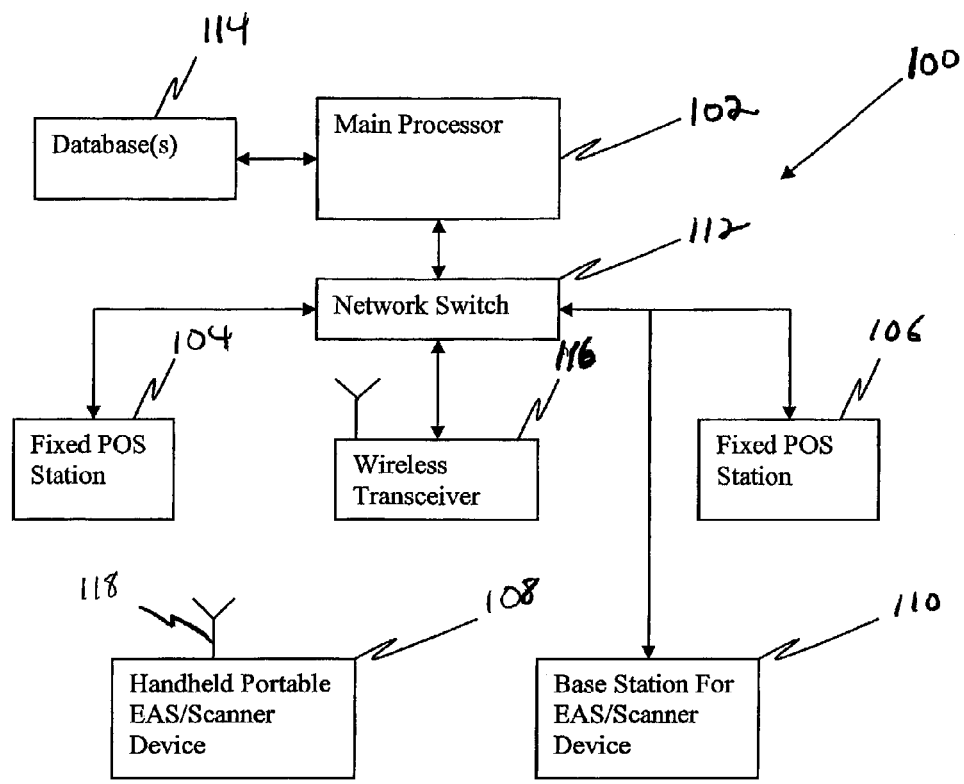
FIG. 1 is a simplified block diagram of an exemplary point of sale network consistent with the present invention.

Turning now to FIG. 1, there is illustrated, in simplified block diagram form, an exemplary point of sale (POS) network 100 consistent with the invention. The illustrated exemplary network includes: a main processor 102, first 104 and second 106 fixed POS stations, a portable combined EAS device and barcode scanner 108 (hereinafter the "EAS/Scanner"), an EAS/scanner base station 110, and a network switch 112. For simplicity and ease of explanation, the main processor 102 is configured for directly accessing one or more databases 114, such as a barcode database containing asset information, and/or a customer checkout or pre-checkout database, as will be described in greater detail below. Those skilled in the art will recognize, however, that one or more databases of information associated with a POS network consistent with the invention may be stored in a machine-readable medium at any one or more locations where it is accessible by a processor configured for retrieving the information. For example, database information may be stored at any one of the POS stations 104, 106, the EAS/Scanner base station 110, or at remote location not local to the controlled area.

In the illustrated exemplary embodiment, the POS stations 104, 106, the EAS/Scanner 108, and the EAS/Scanner base station 110 are connected in the network for bi-directional data communication with the main processor 102. Through the network connection, these devices may read and write information to one or more databases 114 accessible by the main processor. Although the illustrated embodiment includes two POS stations, one portable EAS/scanner, and one EAS/scanner base station, those skilled in the art will recognize that the system may be configured with any number of these elements as nodes on the network.

In the illustrated exemplary embodiment the POS stations 104, 106 and the EAS/Scanner base station 110 are connected for communication with the main/processor through associated network cables and the network switch 112. However, any of a variety of well known network configurations, including WAN and LAN configurations, and protocols may be used to establish such bi-directional communication. Nodes on the network may be connected through network cables or through a wireless communication configuration. Also, any node on the network may be configured for communication with any other node. Communication may be established, for example, between the EAS/Scanner base station 110 and the POS stations 104, 106, between POS stations, etc.

The EAS/scanner 108 is entirely portable within a controlled area such as a retail store, and may be connected to the POS network 100 through a wireless transceiver 116. Those skilled in the art will recognize that the EAS/Scanner may be wirelessly connected to the network in a variety of ways, e.g. through communication of electromagnetic signals between antennas, by an infra red link such as an IrDA0 link, etc. In the illustrated exemplary embodiment, an antenna 118 on the combined EAS/Scanner transmits and receives data, e.g. product information, system configuration and programming, etc., from the wireless transceiver, which is coupled to the network switch 112.

The EAS/Scanner 108 may thus be configured as a node on the network 100 with bi-directional communication with all other nodes, e.g. the main processor 102, POS stations 104, 106, the EAS base station 110, and other EAS/Scanners. The EAS/Scanner 108 may also, or alternatively, be configured for mounting to the base station 110 for downloading/uploading data from the base station. When mounted to the base station, bi-directional communication between the EAS/Scanner 108 and the network nodes may be established via the base station's network connection.

In addition, the base station 110 may include battery charging circuitry for charging a battery in the EAS/Scanner. The base station may also be mounted to a fixed structure and configured to lock the portable EAS/Scanner 108 in place. For security, removal of the EAS/Scanner 108 from the base station 110 may be achieved through entry of an appropriate security code on the base station or EAS/Scanner.

Figure 2:
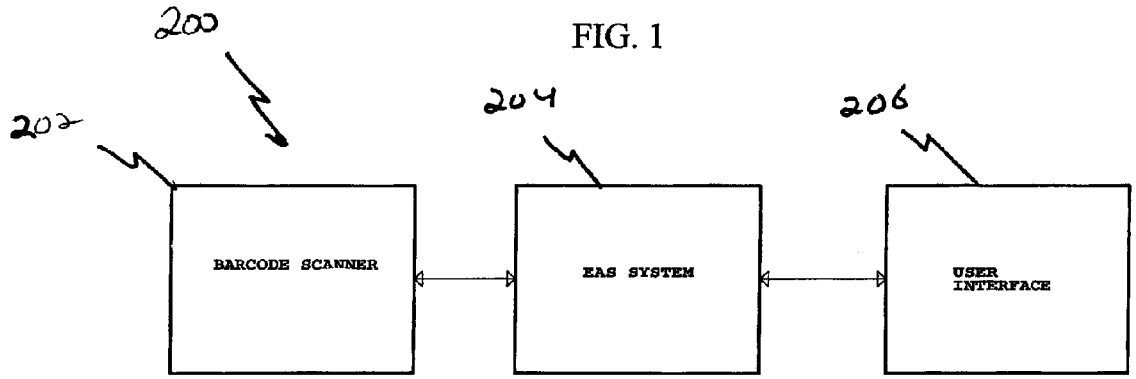
FIG. 2 is a block diagram of an exemplary portable combined EAS device and barcode scanner consistent with the invention.

Advantageously, the EAS/Scanner may be configured to scan barcodes and to detect and modify the activation state, i.e. to deactivate, activate and/or reactivate, of an EAS tag/marker. An exemplary embodiment of an exemplary EAS/Scanner 200 useful in connection with the present invention is illustrated in block diagram form in FIG. 2. The illustrated exemplary embodiment includes a barcode scanner 202, an EAS system 204 and a user interface 206. The barcode scanner 202 may be any of a variety of well known and commercially available barcode scan engines, such pen-type, CCD, Laser or camera based systems. The barcode scanner 202 may be interfaced with the EAS system 204 via control input/output (I/O) connections and a serial communications line.

The EAS system 204 may be configured to detect and modify the activation state of any type of EAS tag/marker. Those skilled in the art will recognize that multiple types of EAS tags exist. The three most common types of EAS tags are EM (electromagnetic), RF (Radio-Frequency), and AM (Acousto-Magnetic). The three different types only work within their respective detection, activation, and deactivation systems. A variety of transmitter and receiver systems for exciting and detecting the presence of such tags are well known and are commercially available. Accordingly, the basic methods of exciting and detecting such tags will not be repeated here. The EAS system 204 may interface with the barcode scanner 202 and the user interface 206.

The user interface 206 may provide a mechanism for facilitating user input to the system. The user interface 206 may be configured to allow a user to change operating modes, enter security codes to enable the device, and to provide information regarding the article being processed. The user interface may also include a backlight button and a power on/off button.

Figure 3:
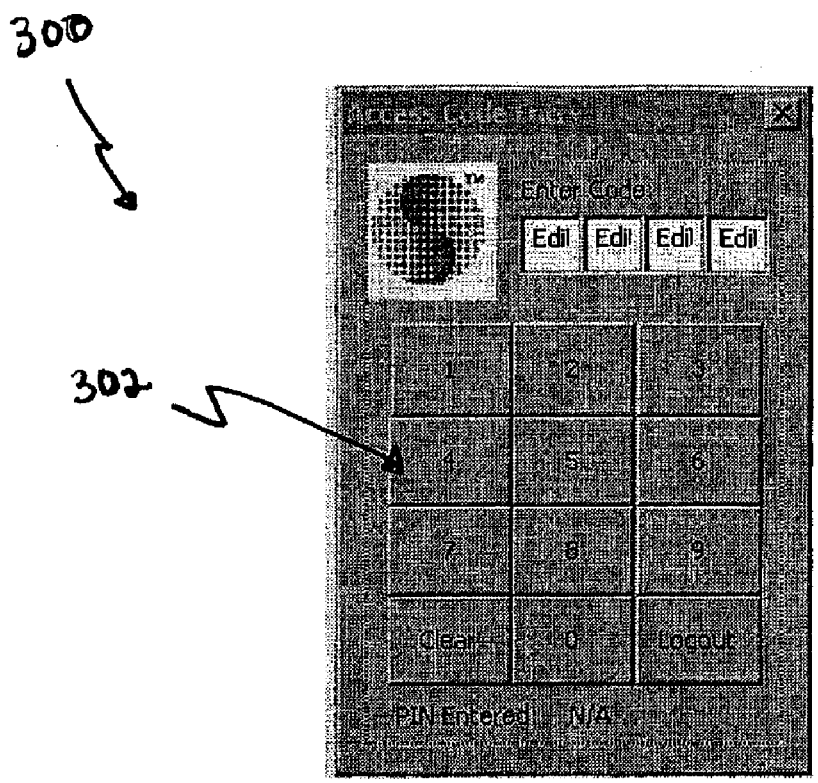
FIG. 3 illustrates an exemplary user interface screen for a combined EAS device and barcode scanner consistent with the invention.
Figure 4:
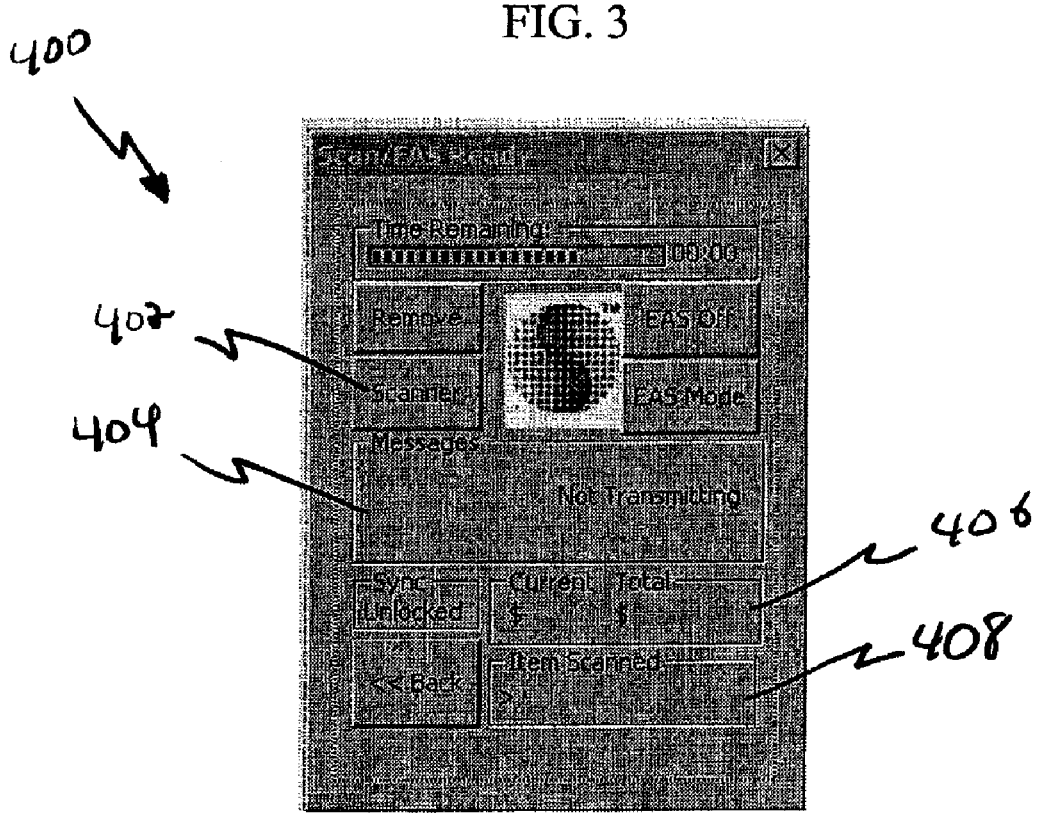
FIG. 4 illustrates another exemplary user interface screen for a combined EAS device and barcode scanner consistent with the invention.

In one embodiment, the user interface may include a touch panel LCD display and a trigger input switch. FIG. 3, for example, illustrates a user interface screen 300 configured for receiving a security code entry. In the illustrated embodiment, a security code may be entered using touch panel numerical keys 302 on the user interface to permit access to selected functionality associated with the security code. Once an appropriate security code is entered, the user interface may allow various barcode scanning and EAS functions to be performed by access to associated user interface screens. FIG. 4, for example, illustrates an exemplary user interface screen 400 for SCAN-EAS mode wherein a user may select the "Scanner" key 402 to scan a barcode and select "EAS Mode" to select an automatic deactivate function of the EAS system. The automatic deactivate function may be configured to automatically deactivate an active EAS tag if a correct barcode is scanned.

Figure 5:
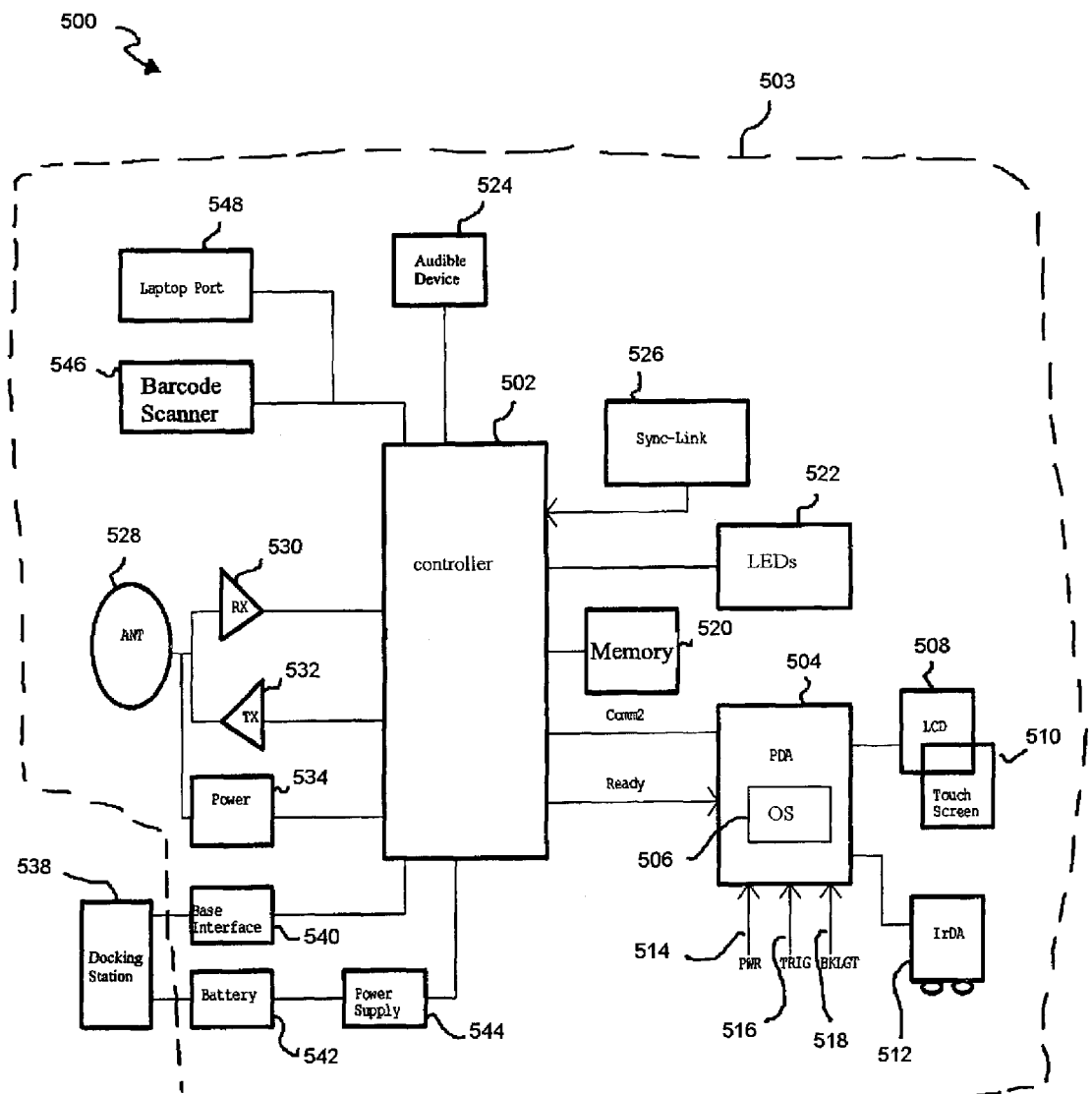
FIG. 5 is a detailed block diagram of one exemplary portable combined EAS device and barcode scanner consistent with the invention.

FIG. 5 is a more detailed block diagram of an exemplary EAS/Scanner system 500 useful in connection with the invention. The EAS/Scanner system 500 includes an EAS/Scanner 503 coupled to a docking or base station 538. The EAS/Scanner 503 includes a controller 502 to control all EAS/Scanner functions. The controller 502 may include a digital signal processor (DSP) and microcontroller.

Memory 520 may be coupled to the controller 504 to provide data storage capabilities. The type and size of such memory 520 may be selected based on particular requirements, e.g., 128 kB of SRAM may be utilized in one instance. A variety of LEDs 522 of varying colors, e.g., green, yellow, and red, may be utilized to provide various visual indicators to a user of the EAS/Scanner 503. An audible device 524 may also be provided to provide a user with an audible output in certain conditions.

The EAS/Scanner 503 includes a barcode scanner 546 coupled to the controller. The barcode scanner 546 may be any variety of scanners known in the art. In addition, an antenna 528 may be configured to act as a transducer to transmit an EAS signal which is used to excite an EAS tag and to receive a return signal from an EAS tag. The antenna 528 may also be utilized to transmit a deactivation signal to deactivate an EAS tag or a reactivation signal to reactivate an EAS tag as further detailed herein.

A receiver 530 may be configured to perform analog signal processing, including amplification and filtering, on the received EAS tag signal. The transmitter 532 may be configured to perform analog signal processing, including amplification, on the transmitted signal to excite an EAS tag. In general, the power module 534 provides analog signal processing, including amplification, on a transmitted signal to deactivate or reactivate an EAS tag.

A synchronization link 526, e.g., a UHF wireless EAS synchronization, may also be provided to synchronize the EAS system 500 of the EAS/Scanner 503 with other EAS devices or systems in the area to eliminate interference between the EAS/Scanner 503 and other EAS devices. Such a synchronization link 526 may utilize a UHF receiver that detects a pulse train at 50/60 Hz used by other EAS systems as a transmit/receive reference. If this signal is lost, the system may revert to an asynchronous rate, e.g., 30 Hz, chosen to avoid interference with other EAS systems A user may interface with the controller 502 via a portable digital assistant (PDA) 504. The PDA 504 may have its own operating system 506. An LCD interface 508, e.g. as shown in FIGS. 3 and 4, may also be provided to display data to a user of the EAS/Scanner 503 and to provide a touch screen mechanism 510 to enable a user to perform various EAS and barcode processing functions, input various data to the EAS/Scanner, e.g., to change operation modes, enter security codes, etc. An infrared data association (IrDA) control unit 512 may also be incorporated in the EAS/Scanner 503. Such unit 512 may provide for wireless infrared bi-directional communication between the EAS/Scanner 503 and any of a variety of devices, e.g., devices in an associated point of sale (POS) network. A laptop port 548 may also be used for external communication.

A power switch may be provided on the EAS/S canner 503 to enable a user to provide a power ON and power OFF command to the EAS/Scanner via the power interface path 514 to the PDA 504. A trigger switch may be provided on the EAS/Scanner 503 to enable a user to provide a trigger function to the EAS/Scanner via a trigger path 516 to the PDA 504. Such trigger path provides a trigger signal, e.g., based on user instructions, as to a desired operation mode. In addition, a backlight switch may be adjusted to adjust backlighting via backlight path 518 to the PDA 504. As such, the brightness of the LCD display 508 may be adjusted to account for various user preferences and lighting conditions.

The EAS/Scanner 503 may be received in a base station 538, which may be coupled to the POS network as described above. The base station 538 may provide a variety of functions including a communication interface for the EAS/Scanner 503 to communicate with other devices and systems, e.g., to upload and download data, and for recharging the battery 542. The battery 542 may be part of the EAS/Scanner 503 and, in one embodiment, may be located in the base of the housing of the EAS/Scanner 503. The battery 542 may be any variety of rechargeable battery. The base interface circuit 540 provides an interface between the EAS/Scanner 503 and base station 538 when the EAS/Scanner 503 is coupled to the base station 538. The base interface circuit 160 may provide communication, charge signals, and power supply protection to the EAS/Scanner 503 when coupled to the base station 538. The battery power supply 544 converts battery voltage to other voltage levels need for the EAS/Scanner 503.

Figure 6:
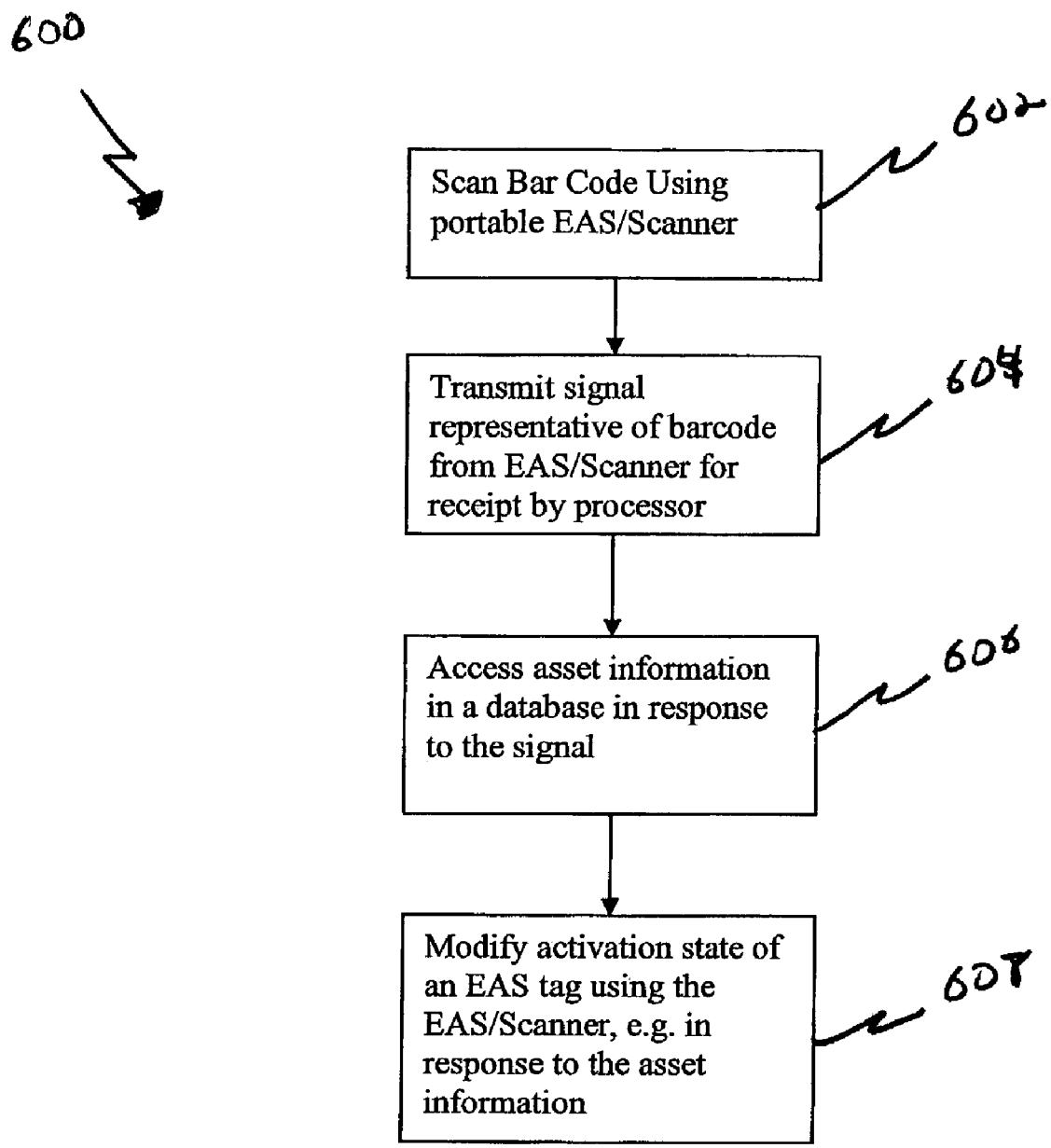
FIG. 6 is a block diagram of an exemplary method of managing an asset consistent with the invention.

Advantageously, a system consistent with the invention including a portable EAS/Scanner allows an operator to perform barcode scanning and EAS processing with significant mobility while maintaining bi-directional communication for accessing database information, e.g. through the main processor 102. As such, a system consistent with the invention facilitates a number of unique asset management functions in a controlled area such as a retail store. FIG. 6, for example, is a block flow diagram of a method 600 consistent with the invention. The block flow diagrams used herein to describe various embodiments include particular sequences of steps. It can be appreciated, however, that the sequence of steps merely provides an example of how the general functionality described herein can be implemented. Further, each sequence of steps does not have to be executed in the order presented unless otherwise indicated.

As shown in FIG. 6 an operator may use a portable EAS/Scanner to scan a bar code on an item 602 and transmit a signal representative of the bar code for receipt by a processor 604, e.g. the main processor 102. In response the transmitted signal, asset information related to the scanned item may be accessed in a database 606. The EAS/Scanner may be used to modify the activation state of an EAS tag on the item 608, e.g. in response to the asset information.

In one embodiment, a system consistent with the invention may be used to facilitate data-logging associated with failed deactivation of an EAS tag at a fixed POS location. In a retail store environment, for example, an article may be purchased at a fixed POS station, but the EAS tag on the article may be inadvertently not deactivated. This can occur for example, when the EAS tag is mistakenly placed by the manufacturer at a location too far from the barcode.

Conventional barcode scanning and EAS deactivation systems at fixed POS stations may scan the barcode and deactivate the tag when a valid code is read. When the tag is placed too far from the barcode, e.g. in excess of 3", the tag may not be deactivated by the EAS system. This can occur repeatedly for a specific article when, for example, the manufacturer packaged the article with the tag consistently at an inappropriate distance from the barcode.

To address this problem in a manner consistent with the invention, when an EAS alarm occurs a security associate may use a portable EAS/Scanner 108 to locate an article carrying an active tag among a customer's items. Once an article carrying an active tag is located, the associate may use the EAS/Scanner 108 to scan the barcode on the article and transmit the barcode information through a wireless connection to the POS network. The barcode information may be sent with a query from the EAS/Scanner 108 to obtain asset information for the article. For example, the EAS/Scanner may query the main processor to accesses a database 114 to determine if the article was properly purchased, as well as the POS station and time at which it was purchased.

This asset information may be transmitted from the main processor 102 over the network to the EAS/Scanner 108 for display on the user interface, e.g. the "Messages" 404, "Current-Total" 406 and/or "Item Scanned" 408 locations of the user interface illustrated in FIG. 4. If the article was properly purchased, as determined from the asset information stored at the database, the EAS/Scanner 108 may be enabled to deactivate the active EAS tag, thereby allowing removal of the article from the location without causing an EAS alarm.

In one embodiment, the EAS/Scanner may provide a visual and/or audible indication that the active tag may be deactivated, and the security associate may operate the EAS/Scanner 108 to deactivate the tag. In another embodiment, the associate may not have direct access to a deactivation mode of the EAS/Scanner 108 for deactivating an active tag. Instead, a signal from the main processor may automatically configure the EAS/Scanner in a deactivation mode in response to the asset information, and the associate may then have limited access to the deactivation mode for deactivating the active tag.

A system consistent with the invention may log the transaction, e.g. in a database, to track items that passed through the fixed POS station without having an active EAS tag deactivated by the station. The transaction may be recorded in a database with information such as the item name and manufacturer, item price, date and time of purchase, and location of the POS station where it was purchased. A review of the transaction log carrying this information may provide an early indication of a manufacturer's error in placement of an EAS tag in the article packaging, a malfunction of a fixed POS station 104, 106, an operator error at a POS station, etc. Steps may then be taken to remedy the cause of the problem, thereby leading to increased efficiency and customer satisfaction.

Barcode data can be combined with EAS data in a system consistent with the invention to perform a variety of other asset management functions. For example, a system consistent with the invention may be used for inventory or asset tracking. In particular, a portable EAS/Scanner may be used to scan barcodes on received inventory. The barcodes on the inventory may be transmitted to the main processor for comparison against database information representing a list of expected inventory. The list of expected inventory may include, for example, item type, manufacturer and quantity. If the scanned items match the lists stored in the database, then shipping and receiving personnel may determine that the inventory was properly received and process the inventory accordingly. Otherwise, the shipping and receiving personnel may receive a visual and/or audible indication that there is an issue with the inventory requiring consideration.

Figure 7:
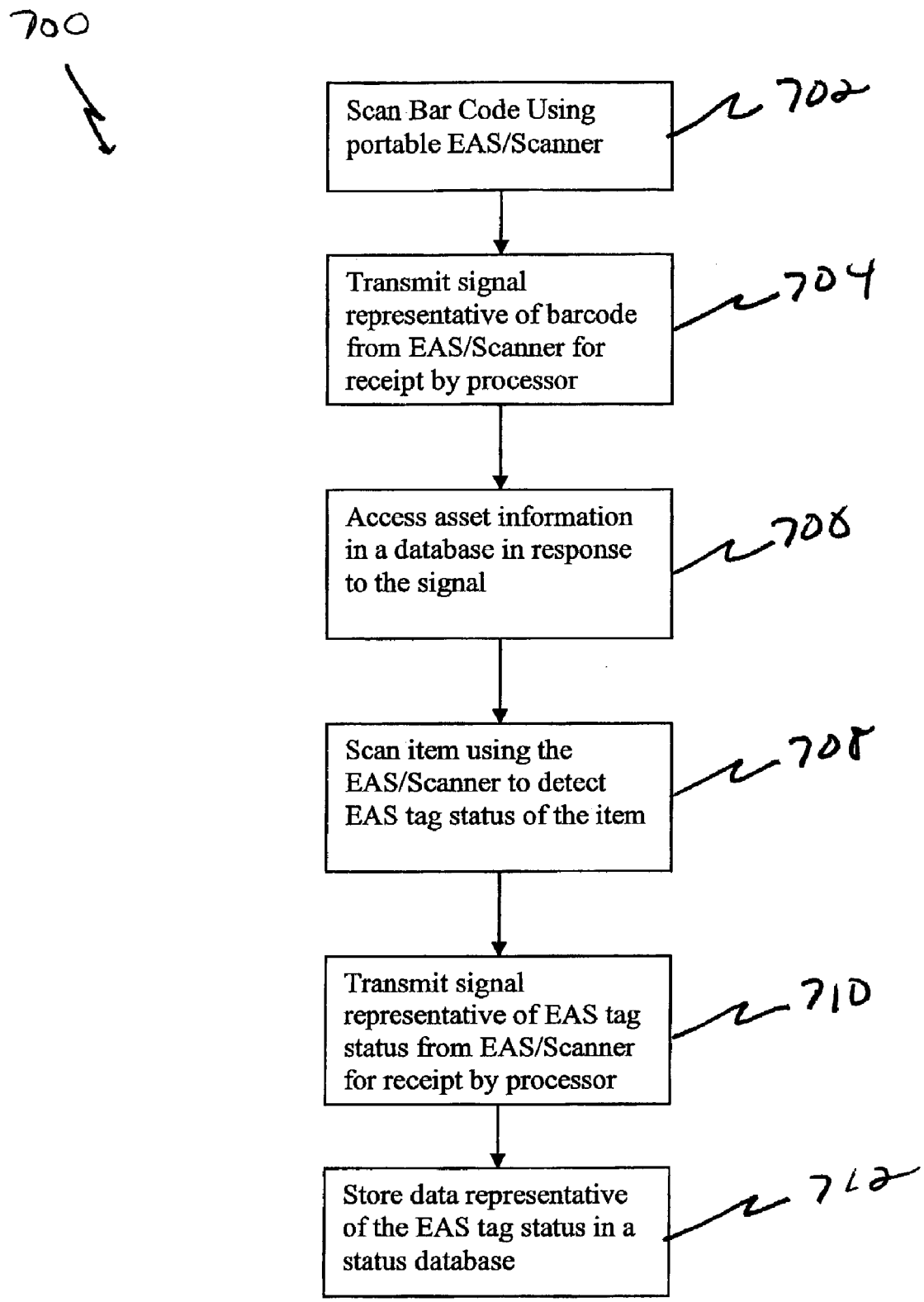
FIG. 7 is a block diagram of another exemplary method of managing an asset consistent with the invention.

In the process of scanning the inventory barcodes, the EAS/Scanner may be used to scan the inventory for EAS tag status to determine if active EAS tags have been affixed thereto by the manufacturer. FIG. 7, for example, is a block flow diagram of a method 700 for verifying EAS tag status consistent with the invention. As shown, when a barcode label is scanned 702 a signal representative of the bar code may be transmitted for receipt by a processor 704, e.g. the main processor 102. In response the transmitted signal, asset information related to the scanned item may be accessed in a database 706. The EAS/Scanner may be used to scan the item to determine the activation state of an EAS tag on the item 708, e.g. in response to the asset information. A signal representative of the EAS tag status may be transmitted by the EAS/Scanner for receipt by the processor 710, e.g. the main processor 102, and data representative of the EAS tag status may be stored in a status database 712.

The EAS tag status may be stored in the status database along with asset information, and/or deactivation/reactivation activity. The data in the status database may be used to provide insights concerning scanned items. If, for example, an EAS tag was detected on an item by an EAS/Scanner 108 the data may provide confirmation that inventory or items that require tagging have, in fact, been tagged. In situations where a retailer pays for tagging of inventory from a manufacturer, confirmation that the manufacturer has properly performed its tagging obligation is provided. Of course, if a tag is not found, then the manufacture can be contacted to remedy the error. Also, if an EAS tag is found on a product that is not supposed to have a tag, an alarm may be provided to indicate the possibility of theft by scanning a lower cost item and then deactivating an EAS label on an expensive item.

Figure 8:
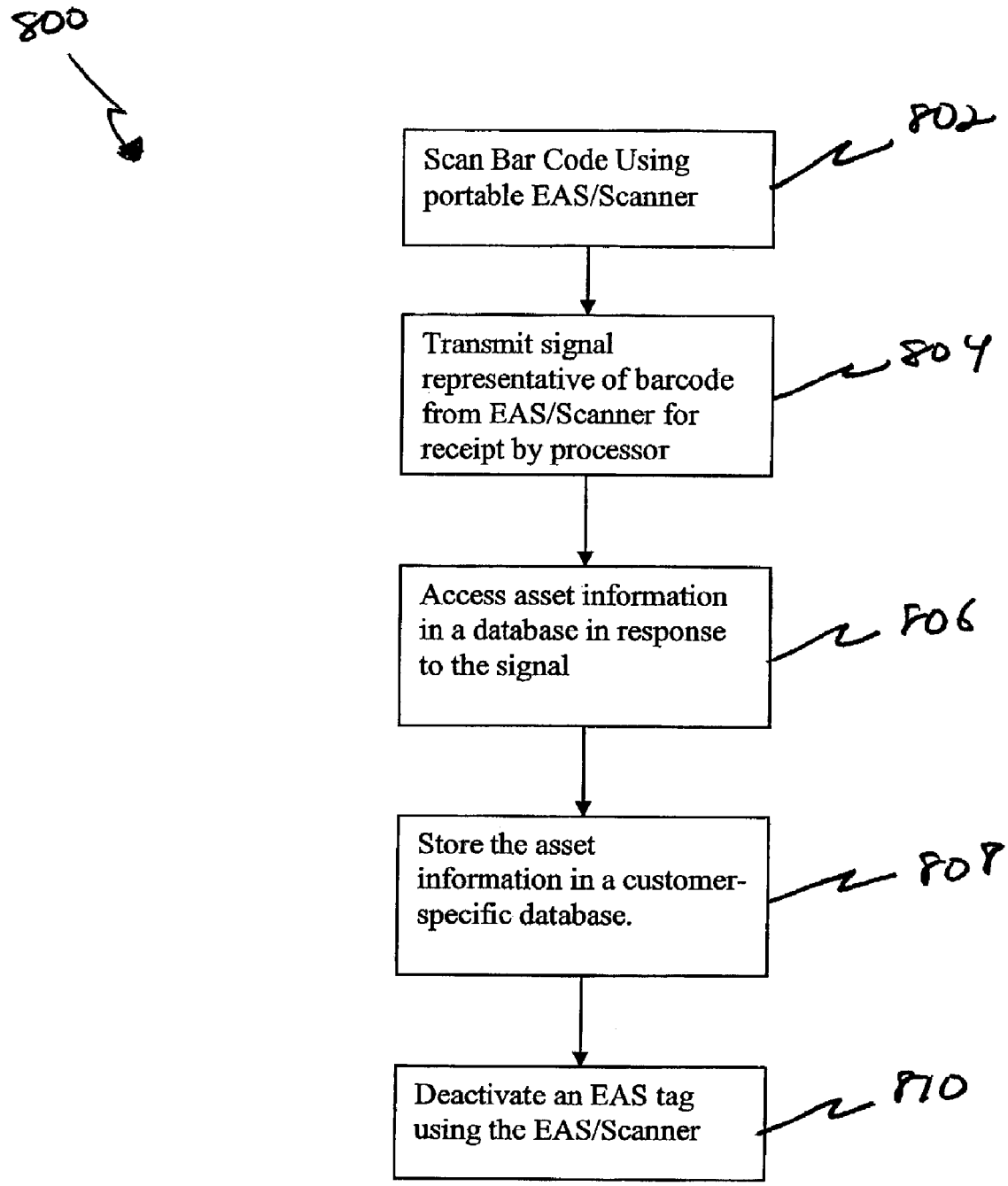
FIG. 8 is a block diagram of another exemplary method of managing an asset consistent with the invention.

FIG. 8 is a block flow diagram of method 800 consistent with the invention for facilitating purchase of items by a customer. As shown, an operator may use a portable EAS/Scanner to scan a bar code on an item 802 and transmit a signal representative of the bar code for receipt by a processor 804, e.g. the main processor 102. In response to the transmitted signal, asset information, e.g. price, product name, etc., related to the scanned item may be accessed in a database 806, and the asset information may be stored in a customer-specific database 808. The EAS/Scanner may be used to deactivate an EAS tag on the item 810, e.g. in response to the asset information.

For example, a system consistent with the invention may be used to facilitate a customer pre-checkout process. Customer pre-checkout may be useful, for example, when lines at fixed POS stations are lengthy. As shown, a sales associate may present a customer with a customer preference card carrying a barcode. The barcode on the customer preference card may be scanned with the portable EAS/Scanner, which may transmit the code, e.g. to the main processor. In response to the scanned code on the customer preference card, the main processor may establish a customer-specific, pre-checkout database associated with the code.

The sales associate may then begin scanning barcodes of articles the customer intends to purchase, with each barcode scan causing POS information related to each article to be stored in the pre-checkout database associated with the code on the customer checkout card. When a valid barcode is scanned, the EAS/Scanner may be enabled, either by a sales associate or automatically by a signal transmitted from the processor, for deactivating an EAS tag the item. If a customer decides that a previously scanned item is not to be purchased, the EAS/Scanner can also be used scan the barcode on the item to remove the item from the pre-checkout database and to reactivate the EAS tag on the item.

Once all items are scanned and deactivated, customer checkout at the fixed POS station may be accomplished by simply scanning the barcode on the customer preference card. When the code on the customer preference card is scanned, the data in the associated pre-checkout database may be downloaded to the fixed POS station to present a total price to the customer. The customer may then tender payment and exit the location with the items.

At the fixed POS station, therefore, only the customer preference card requires scanning to check-out numerous customer items. This can significantly improve the efficiency of processing items at the POS, especially during busy shopping times and seasons. Less time required at the POS station, of course, translates directly into increased customer satisfaction.

A variety of other customer-related applications are possible in a system consistent with the invention. For example, customers may use the EAS/Scanner to roam a retail location and scan the barcode of items they wish to purchase. The EAS/Scanner allows the user to associate their items with, for example, a customer preference card as described above. When an item is selected for purchase, information relating to the purchase may be stored in a customer-specific database, and an EAS tag on the item may be deactivated. When a customer decides that previously scanned item is not to be purchased, the EAS/Scanner can also scan the barcode on the item to remove the item from the database and to reactivate the EAS tag on the item.

Numerous other advantages are associated with a system consistent with the invention. For example, a system consistent with the invention including a handled EAS/Scanner eliminates the difficulties of scanning barcodes and deactivating EAS tags on large or bulky items that do not physically fit in the limited space available at the POS station. Large and/or bulky items can be scanned and deactivated in a system consistent with the invention at locations distant from a fixed POS station, such as a loading dock, or store exit. The scanned information may then be communicated from the portable EAS/Scanner for customer-checkout.

It will be appreciated that the functionality described for the embodiments of the invention may be implemented using hardware, software, or a combination of hardware and software, and well-known signal processing techniques. If implemented in software, a processor and machine-readable medium is required. The processor can be any type of processor capable of providing the speed and functionality required by the embodiments of the invention. For example, the processor could be a process from the Pentium® family of processors made by Intel Corporation, or the family of processors made by Motorola. Machine-readable media include any media capable of storing instructions adapted to be executed by a processor. Some examples of such media include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), optical disk (e.g. CD-ROM), and any other device that can store digital information. In one embodiment, the instructions are stored on the medium in a compressed and/or encrypted format.

As used herein, the phrase "adapted to be executed by a processor" is meant to encompass instructions stored in a compressed and/or encrypted format, as well as instructions that have to be compiled or installed by an installer before being executed by the processor. Further, the processor and machine-readable medium may be part of a larger system that may contain various combinations of machine-readable storage devices through various I/O controllers, which are accessible by the processor and which are capable of storing a combination of computer program instructions and data.

There is thus provided a POS network including a wireless EAS/Scanner providing an operator with significant mobility in a controlled area for performing various combined barcode scanning and EAS processes. The embodiments that have been described herein, however, are but some of the several which utilize this invention and are set forth here by way of illustration but not of limitation. For example, various features and advantages described herein may be combined or used separately. It is obvious that many other embodiments, which will be readily apparent to those skilled in the art, may be made without departing materially from the spirit and scope of the invention.

What is claimed is:

1. A method of managing an asset carrying a barcode and an electronic article surveillance (EAS) tag, the method comprising:

providing a point of sale (POS) network comprising a processor configured for accessing a database;

providing a portable EAS/Scanner wirelessly connected to said POS network for bi-directional communication with said processor, said EAS/Scanner comprising an EAS system for modifying an activation state of said EAS tag and a barcode scanner for scanning said barcode;

scanning said barcode using said EAS/Scanner;

transmitting a signal representative of said barcode from said EAS/Scanner for receipt by said processor;

scanning said item using said EAS/Scanner to detect said EAS tag status;

transmitting a signal representative of said EAS tag status from said EAS/Scanner for receipt by said processor;

accessing asset information in said database in response to said signal representative of said barcode; and deactivating said EAS tag using said EAS/Scanner in response to said asset information, the deactivating of the EAS tag being performed without regard to purchase of the asset.

2. A method according to claim 1, the method further comprising re-activating said EAS tag.

3. A method according to claim 1, wherein said asset information comprises sales transaction information for said asset.

4. A method according to claim 3, wherein said sales transaction information indicates whether said asset has been properly purchased.

5. A method according to claim 1, wherein said asset information indicates whether said barcode is valid.

6. A method according to claim 1, said method further comprising transmitting an asset information signal representative of said asset information to said EAS/Scanner.

7. A method according to claim 1, wherein said EAS/Scanner is manually enabled for modifying said activation state of said EAS tag.

8. A method according to claim 1, wherein said database is a customer-specific database.

9. A method according to claim 1, said method further comprising storing said asset information and said activation state in a transaction database.

10. A method according to claim 9, said method further comprising reviewing said transaction database to identify repeated failure to deactivate EAS tags at a fixed POS station.

11. A method according to claim 9, said method Further comprising reviewing said transaction database to identify EAS tag placement errors.

12. The method of claim 1, further comprising:
determining if said EAS tag has been deactivated; and
logging in said database the identity of the asset carrying said EAS tag if said EAS tag has not been deactivated.

13. A method of facilitating purchase of an asset carrying to which is affixed a barcode and an electronic article surveillance (EAS) tag, the method comprising:
providing network comprising a processor configured for accessing a database;
providing a portable EAS/Scanner wirelessly connected to said POS network for bi-directional communication with said processor, said EAS/Scanner comprising an EAS system for modifying an activation state of said EAS tag and a barcode scanner for scanning said barcode;
scanning said barcode using said EAS/Scanner;
transmitting a signal representative of said barcode from said EAS/Scanner for receipt by said processor;
scanning said item using said EAS/Scanner to detect said EAS tag status;
transmitting a signal representative of said EAS tag status from said EAS/Scanner for receipt by said processor;
accessing asset information in said database in response to said signal representative of said barcode;
storing said asset information in a customer-specific database; and
deactivating said EAS tag using said EAS/Scanner in response to said asset information, the deactivating of the EAS tag being performed without regard to purchase of the asset.

14. A method according to claim 13, wherein said asset information comprises sales transaction information for said asset.

15. A method according to claim 13, wherein said asset information indicates whether said barcode is valid.

16. A method according to claim 13, said method further comprising transmitting an asset information signal representative of said asset information to said EAS/Scanner.

17. A method according to claim 13, wherein said EAS/Scanner is manually enabled for modifying said activation state of said EAS tag.

18. A method according to claim 13, wherein said method further comprises:
performing a second scan of said barcode using said EAS/Scanner,
transmitting a second signal representative of said barcode from said EAS/Scanner for receipt by said processor; and
removing said asset information from said customer-specific database in said database in response to said second signal representative of said barcode.

19. A method according to claim 18, said method further comprising activating said EAS tag following removal of said asset information from said customer-specific database.

20. The method of claim 13, wherein deactivating said EAS tag using said EAS/Scanner in response to said asset information is performed automatically.

21. The method of claim 13, wherein deactivating said EAS tag using said EAS/Scanner in response to said asset information is performed manually.

22. A method of verifying an electronic article surveillance (EAS) tag status of an asset carrying a barcode, the method comprising:
providing a point of sale (POS) network comprising a processor configured for accessing a database;
providing a portable EAS/Scanner wirelessly connected to said POS network for bi-directional communication with said processor, said EAS/Scanner comprising an EAS system for modifying an activation state of said EAS tag and a barcode scanner for scanning said barcode;
scanning said barcode using said EAS/Scanner;
transmitting a signal representative of said barcode from said EAS/Scanner for receipt by said processor; accessing asset information in said database in response to said signal representative of said barcode, the asset information including information regarding which items are to be tagged;
scanning said item using said EAS/Scanner to detect said EAS tag status;
transmitting a signal representative of said EAS tag status from said EAS/Scanner for receipt by said processor;
storing data representative of said EAS tag status in a status database; and
comparing the signal representative of said EAS tag status with the information regarding which items are to be tagged to determine if a tag has been improperly placed.

23. A method according to claim 22, said method further comprising storing said asset information in said status database.

24. A method according to claim 23, wherein said asset information comprises an intended EAS status for said asset.

25. A method according to claim 22, said method further comprising transmitting an asset information signal representative of said asset information to said EAS/Scanner.

26. A method according to claim 22, said method further comprising reviewing said status database to identify failure to place an EAS tag on said asset.

27. A method according to claim 22, said method further comprising reviewing said status database to identify inadvertent affixation of an EAS tag on said asset.

28. The method of claim 22, further comprising activating an alarm to indicate the possibility of an erroneously placed tag.

29. A network for use with an asset to which is affixed a barcode and an electronic article surveillance (EAS) tag, the network comprising:

a processor configured for accessing a database; and at least one portable EAS/Scanner wirelessly connected for bi-directional communication with said processor, said EAS/Scanner comprising an EAS system configured to scan said item to detect said EAS tag status; transmit a signal representative of said EAS tag status for receipt by said processor, and modify an activation state of said EAS tag, and a barcode scanner configured to scan said barcode, said EAS/Scanner being configured to access said database in response to information carried by said barcode to obtain asset information, said EAS system being configured for deactivating the EAS tag in response to said asset information, without regard to purchase of the asset.

30. A network according to claim 29, said network comprising at least one fixed point-of-sale (POS) station for facilitating purchase of said asset by a customer, said fixed POS station being connected for bi-directional communication with said processor.

* * * * *